United States Patent
Corsi et al.

(10) Patent No.: US 11,645,113 B2
(45) Date of Patent: May 9, 2023

(54) WORK SCHEDULING ON CANDIDATE COLLECTIONS OF PROCESSING UNITS SELECTED ACCORDING TO A CRITERION

(71) Applicant: HEWLETT PACKARD ENTERPRISE DEVELOPMENT LP, Houston, TX (US)

(72) Inventors: Christopher Joseph Corsi, Wake Forest, NC (US); Prashanth Soundarapandian, San Jose, CA (US); Matti Antero Vanninen, Cary, NC (US); Siddharth Munshi, Durham, NC (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 63 days.

(21) Appl. No.: 17/245,569

(22) Filed: Apr. 30, 2021

(65) Prior Publication Data
US 2022/0350648 A1    Nov. 3, 2022

(51) Int. Cl.
G06F 9/48 (2006.01)
G06F 9/50 (2006.01)
G06F 15/80 (2006.01)

(52) U.S. Cl.
CPC .......... *G06F 9/4881* (2013.01); *G06F 9/4831* (2013.01); *G06F 9/5038* (2013.01); *G06F 15/80* (2013.01)

(58) Field of Classification Search
CPC ..... G06F 9/4831; G06F 9/4881; G06F 9/5038
See application file for complete search history.

(56) References Cited

U.S. PATENT DOCUMENTS

| | | | |
|---|---|---|---|
| 7,472,233 B2 | 12/2008 | Mckenney et al. | |
| 8,701,115 B2 | 4/2014 | Bhandari et al. | |
| 9,563,474 B2 | 2/2017 | Govindarajeswaran et al. | |
| 10,691,559 B2 | 6/2020 | Marathe et al. | |
| 2014/0208331 A1* | 7/2014 | Li | G06F 9/5033 718/105 |
| 2014/0373020 A1* | 12/2014 | Govindarajeswaran | G06F 9/5027 718/102 |

(Continued)

OTHER PUBLICATIONS

Psaroudakis I. et al., Scaling Up Concurrent Main-Memory Column-Store Scans: Towards Adaptive NUMA-aware Data and Task Placement, (Research Paper), Proceedings of the VLDB Endowment, Aug. 2015, vol. 8, No. 12., 12 Pgs.

(Continued)

*Primary Examiner* — Jacob Petranek
(74) *Attorney, Agent, or Firm* — Trop, Pruner & Hu, P.C.

(57) ABSTRACT

In some examples, a system receives a first unit of work to be scheduled in the system that includes a plurality of collections of processing units to execute units of work, where each respective collection of processing units of the plurality of collections of processing units is associated with a corresponding scheduling queue. The system selects, for the first unit of work according to a first criterion, candidate collections from among the plurality of collections of processing units, and enqueues the first unit of work in a schedule queue associated with a selected collection of processing units that is selected, according to a selection criterion, from among the candidate collections.

20 Claims, 5 Drawing Sheets

(56) References Cited

U.S. PATENT DOCUMENTS

| | | | |
|---|---|---|---|
| 2015/0135183 A1* | 5/2015 | Kipp | G06F 9/5038 |
| | | | 718/103 |
| 2015/0324234 A1* | 11/2015 | Chang | G06F 9/5016 |
| | | | 718/104 |
| 2018/0113965 A1 | 4/2018 | Harris et al. | |
| 2020/0409754 A1* | 12/2020 | Li | G06F 9/466 |
| 2021/0064234 A1 | 3/2021 | Zhang et al. | |

OTHER PUBLICATIONS

Pusukuri K. K. et al., Tumbler: An Effective Load Balancing Technique for MultiCPU Multicore Systems, (Research Paper), ACM Transactions on Architecture and Code Optimization, Jan. 2015, 22 Pgs.

Rihani et al., MultiQueues: Simpler, Faster, and Better Relaxed Concurrent Priority Queues, Nov. 5, 2014 (16 pages).

\* cited by examiner

WORK SCHEDULING ON CANDIDATE COLLECTIONS OF PROCESSING UNITS SELECTED ACCORDING TO A CRITERION

BACKGROUND

A computing system includes processing resources that can be used to execute units of work. The processing resources can include multiple processors and/or cores of multi-core processors. A scheduler can be used to schedule the units of work for execution on the processing resources.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A computing system includes processing resources that can be used to execute units of work. The processing resources can include multiple processors and/or cores of multi-core processors. A scheduler can be used to schedule the units of work for execution on the processing resources.

A "unit of work" can refer to any task that is to be performed in a computing system. Note that a task can be part of a larger collection of tasks (such as a transaction, an operation, etc.).

Some units of work are associated with higher priorities than other units of work. Also, some units of work can take a larger amount of time to execute than other units of work. In some cases, a lower priority unit of work that that takes a relatively long time to execute can prevent a higher priority unit of work that takes a relatively short time from executing if no idle processing resources are available.

To ensure that higher priority units of work that take a smaller amount of time to execute are not starved, schedulers may implement various scheduling techniques to reduce contention between the different types of units of work. In some cases, the scheduling techniques can be quite complex and the resource usage of schedulers that implement such scheduling techniques may increase with the quantity of processing resources on which units of work are to be scheduled. In other words, scheduling complexity can increase with the quantity of processing resources, which can increase scheduling overheads.

In accordance with some implementations of the present disclosure, a scheduler is able to schedule units of work on processing units of a computing system. A "processing unit" can refer to a resource that is able to execute machine-readable instructions to perform a unit of work. The processing unit can include a hardware processing resource or a logical processing resource.

In some examples, a scheduling technique employed by the scheduler has a cost (in terms of resource usage associated with work scheduling) that does not substantially scale (increase) with the quantity of processing units in a computing system. The scheduling technique also can take into account locality of processing units in performing work. The scheduling technique may also seek to reduce usage of the amount of locks when scheduling units of work.

Figure 1:
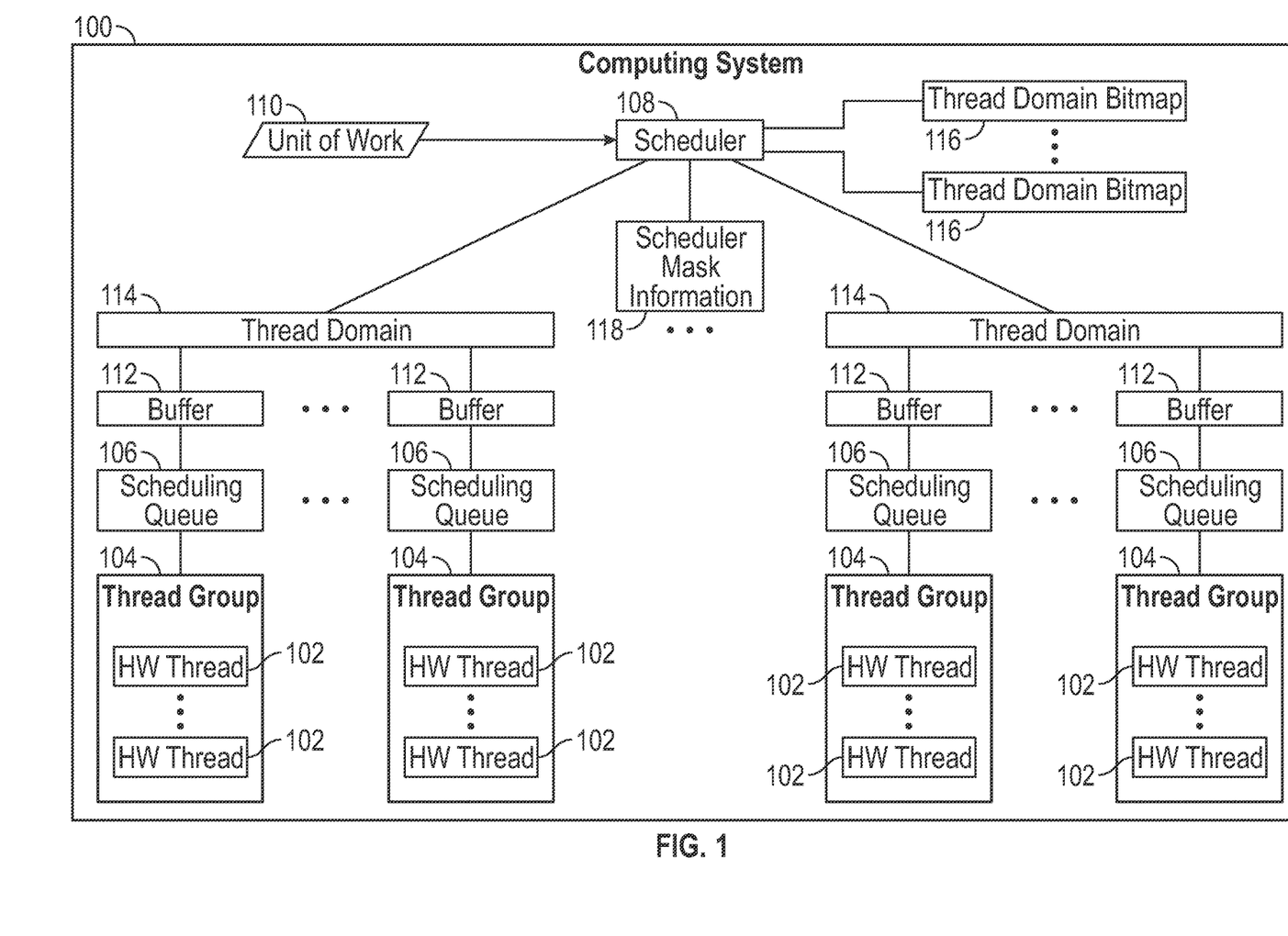
FIG. 1 is a block diagram of a computing system including a scheduler, thread groups, and scheduling queues according to some examples.

FIG. 1 is a block diagram of a computing system 100 according to some examples. The computing system 100 can include any type of system that is able to execute units of work. For example, the computing system 100 can include any or some combination of the following: a storage controller (or multiple storage controllers) that manage(s) access of data stored in storage devices, a server computer (or multiple server computers), a cloud computer (or multiple cloud computers), and so forth.

In some examples, processing units in the computing system 100 are in the form of hardware threads. Hardware threads can also be referred to as central processing unit (CPU) threads. A "hardware thread" can refer to a processing resource (whether physical or logical) that is able to execute a unit of work.

As shown in FIG. 1, the hardware threads 102 are divided into thread groups. Each thread group can include a number of hardware threads, where a "number" can refer to a single hardware thread or multiple hardware threads.

Figure 2:
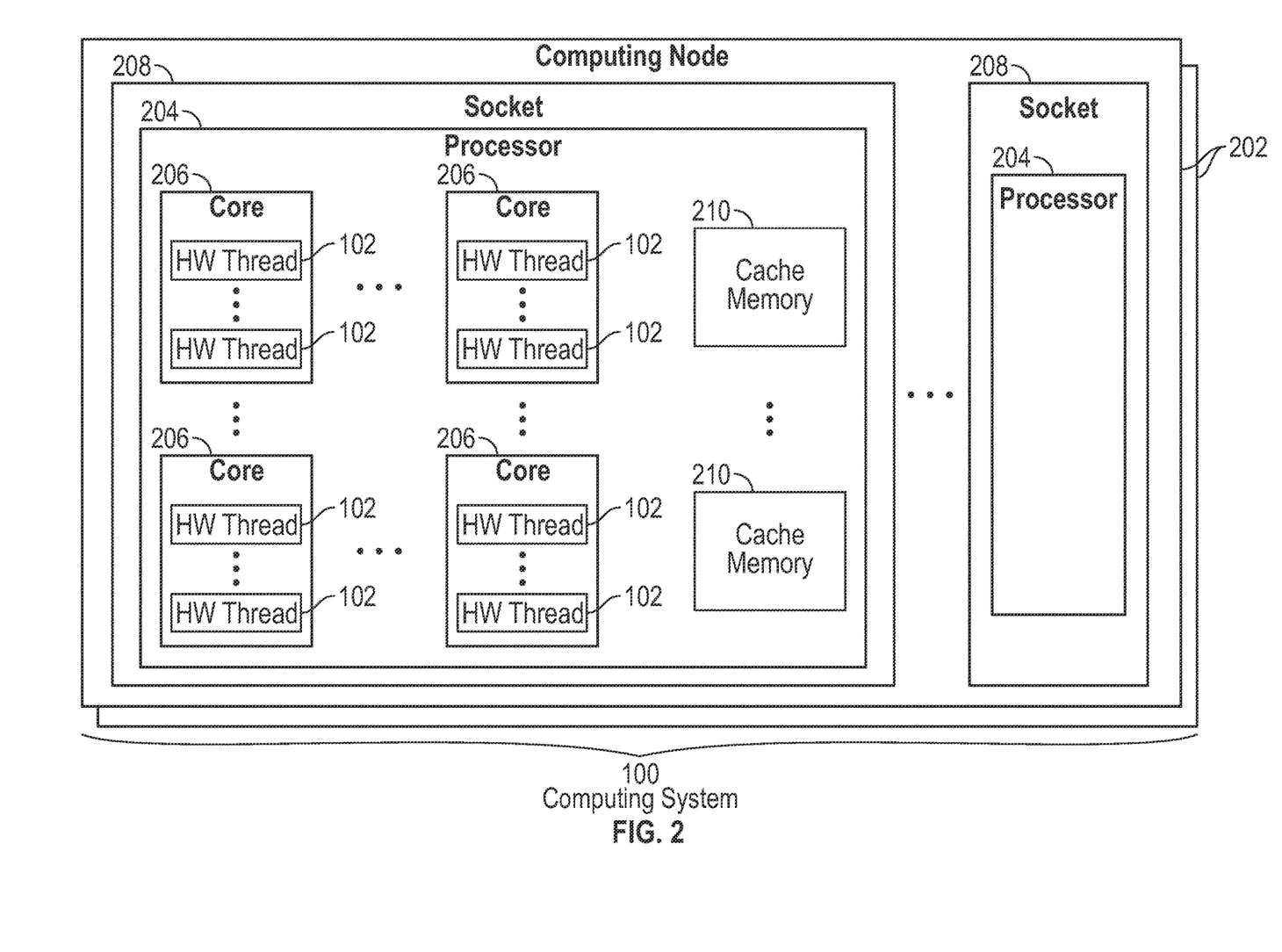
FIG. 2 is a block diagram of a computing system according to some examples.

With further reference to FIG. 2, an example hardware arrangement of the computing system 100 is depicted. The computing system 100 includes multiple computing nodes 202, where each computing node 202 includes multiple processors 204. In other examples, the computing system 100 can include just one computing node, and/or a computing node 202 can include just one processor 204.

In some examples, each processor 204 can be a multi-core processor that has multiple physical cores 206. A "physical core" of a processor includes an arrangement of processing circuitry that is able to execute machine-readable instructions. The multiple physical cores 206 of a processor 204 are able to concurrently execute machine-readable instructions.

In some examples, there is one hardware thread 102 per physical core 206. In other examples, there can be multiple hardware threads 102 per physical core 206. Multiple hardware threads 102 per physical core 206 can be present if simultaneous multithreading (SMT) is supported. For example, processors from Intel Corporation may support hyperthreading, which is a form of SMT. SMT is also supported with processors from other vendors.

If SMT is supported, an operating system (OS) of the computing system 100 can partition each physical core 206 into multiple parts (for implementing logical cores) that can execute units of work. The logical cores are able to independently execute machine-readable instructions to perform corresponding units of work. Note that the logical cores may or may not simultaneously execute the machine-readable instructions.

In other examples, techniques or mechanisms according to some implementations of the present disclosure are applicable with processors that do not support SMT.

Each thread group 104 is associated with a respective scheduling queue 106. In the example of FIG. 1, there is one scheduling queue 106 per thread group 104. In different examples, there can be more than one scheduling queue 106 for each thread group 104. In other examples, one scheduling queue 106 may be shared by multiple thread groups 104.

The "scheduling queue" refers to any data structure that is able to contain information referring to units of work. For example, the information referring to units of work can include pointers or other references to the units of work (or more specifically, to machine-readable instructions that are to perform the units of work). In other examples, a scheduling queue can store information including the machine-readable instructions. In some examples, a scheduling queue can be in the form of a scheduling heap or scheduling priority queue, in which units of work are ordered according to priorities associated with the units of work (relative priorities of the units of work may be indicated by metadata associated with the units of work).

FIG. 1 further shows a scheduler 108 in the computing system 100. The scheduler 108 receives units of work to schedule for execution by a hardware thread 102 that is selected according to a scheduling technique according to some implementations of the present disclosure. As shown in FIG. 1, the scheduler 108 receives a unit of work 110 that is to be scheduled for execution in the computing system 100. As used here, the scheduler 108 receiving a unit of work can refer to the scheduler 108 receiving information referring to the unit of work.

The scheduler 108 can be implemented using machine-readable instructions, or a combination of machine-readable instructions and hardware processing circuitry. Although shown as a singular unit, note that there may be multiple instances of the scheduler 108 executing in the computing system 100, where the multiple instances of the scheduler 108 can execute in parallel and can interact with one another for the purpose of scheduling units of work.

In some examples, a buffer 112 is provided before each scheduling queue 106. The scheduler 108 can insert a unit of work into a buffer 112, instead of directly into the corresponding scheduling queue 106. In other examples, the buffers 112 can be omitted.

A buffer 112 can be a lockless buffer to temporarily store information of units of work scheduled by the scheduler 108 for execution by a corresponding thread group 104. A lockless buffer refers to a buffer into which a unit of work can be inserted without first obtaining a lock on the buffer or any part of the buffer. Inserting a unit of work into a buffer or scheduling queue can refer to inserting information referring to the unit of work into the buffer.

For example, the buffer 112 can include a first in first out (FIFO) buffer. Units of work can be added to respective entries of the FIFO buffer such that the first unit of work added to the FIFO buffer is the first unit of work removed from the FIFO buffer. In some examples, an idle hardware thread 102 in a respective thread group 104 is able to retrieve a unit of work from the buffer 112. A hardware thread 102 is idle if the hardware thread 102 is not currently executing machine-readable instructions. The idle hardware thread 102 can execute the unit of work retrieved from the buffer 112, or a unit of work in the scheduling queue 106, depending on the relative priorities of the units of work.

Each unit of work in the buffer 112 and the scheduling queue 106 can be associated with metadata indicating the relative priority of the unit of work. The metadata can include a priority indicator that can be set to any of various different values (e.g., categorical values such as low, medium, and high, or numerical values) to indicate respective different priorities of the unit of work.

In other examples, the metadata for each unit of work in the buffer 112 and the scheduling queue 106 can indicate the type of work. For example, a unit of work can include foreground work or background work, where background work executes in the background when processing resources not executing foreground work are available. In further examples, the metadata for each unit of work in the buffer 112 and the scheduling queue 106 can indicate other types of work, such as work relating to processing data packets according to network or other protocols, work relating to read/write operations requested by hosts, work relating to synchronizing data to secondary storage (e.g., disk-based storage), work relating to garbage collection to free up storage space, and so forth. Some types of works can be considered to be more important (e.g., have a higher priority) than other types of work.

By using the lockless buffers 112, the scheduler 108 can avoid having to take locks across the thread groups 104 in the "normal" enqueue pathway, i.e., the enqueue pathway where the scheduler 108 adds a unit of work to a corresponding scheduling queue 106 based on the scheduling applied by the scheduler 108. Hardware threads 102 can transfer units of work from the lockless buffers 112 to their associated scheduling queues 106 prior to de-queueing the units of work.

In some examples, multiple thread domains 114 are defined, where each thread domain 114 includes a respective collection of thread groups 104. A thread domain 114 includes a collection of thread groups 104 that include hardware threads 102 that share a number of physical resources, where the number of physical resources can include any or some combination of the following: a cache memory (e.g., a level 3 or L3 cache memory), a socket, or a computing node.

As depicted in FIG. 2, a computing node 202 can include multiple sockets 208, where each socket 208 can refer generally to some physical grouping of a number of processors 204 (one processor or multiple processors). In the example depicted in FIG. 2, each socket 208 receives one processor 204. In other examples, each socket 208 can receive multiple processors 204. In some examples, a socket can refer to a connector assembly that can make a physical and electrical connection with a processor or multiple processors. In other examples, a "socket" can refer more generally to another grouping of processors.

In some examples, the computing nodes 202 of the computing system 100 are part of a non-uniform memory access (NUMA) arrangement. In a NUMA arrangement, the access time of data in a memory by a processor 204 (or by a core 206 of a processor 204) depends upon the location of the memory relative to the processor (core). For example, a processor (core) can access local memory that is connected to the processor (core) over a memory bus faster than a memory that is located more remotely, such as on another socket or another computing node 202.

In other examples, a non-NUMA arrangement is employed.

As further shown in FIG. 2, each processor 204 can include multiple cache memories 210. In other examples, the cache memories 210 can be external of a processor 204. The cache memories 210 can be L3 cache memories. An L3 cache memory can be part of a hierarchical arrangement of cache memories. The hierarchical arrangement of cache memories can include level 1 (L1) and level 2 (L2) cache memories that are more localized or equally localized with respect to corresponding processor cores 206 than the L3 cache memories. For example, an L1 cache memory and an L2 cache memory can be part of a physical core 206 or external of the physical core 206. In further examples, the hierarchical arrangement of cache memories can include level 4 (L4) cache memories that are less localized or equally localized with respect to corresponding processor cores 206 than the L3 cache memories.

A first subset of the physical cores 206 of a processor 204 can share a first cache memory 210, a second subset of physical cores 206 of the processor 204 can share a second cache memory 210, and so forth.

In some examples, a thread domain 114 can include thread groups 104 with hardware threads 102 that share the same cache memory 210 (e.g., L3 cache memory). In further examples, a thread domain 114 can include thread groups 104 with hardware threads 102 that share the same socket 208 (i.e., the hardware threads 102 are part of processor(s) 204 in the same socket 208). In other examples, a thread domain 114 can include thread groups 104 with hardware threads 102 that are part of the same computing node 202.

In some examples, the scheduler 108 can track which hardware threads are idle. For example, the scheduler 108 can maintain a thread domain bitmap 116 for each respective thread domain 114. For example, the scheduler 108 can maintain a first thread domain bitmap 116 for a first thread domain 114, a second thread domain bitmap 116 for a second thread domain 114, and so forth.

A thread domain bitmap 116 can include a collection of bits that correspond to respective hardware threads 102 of a thread domain 114. A bit in the thread domain bitmap 116 when set to a first value (e.g., logical "1" or "0") can indicate that the respective hardware thread 102 is idle. A bit in the thread domain bitmap 116 when set to a different second value (e.g., logical "0" or "1") can indicate that the respective hardware thread 102 is not idle (i.e., is busy executing machine-readable instructions).

More generally, the scheduler 108 can maintain a data structure for each respective thread domain 114, where the data structure includes indicators for indicating whether or not corresponding hardware threads 102 in the respective thread domain 114 are idle or busy.

In some examples, when a hardware thread 102 transitions from being busy to idle, the hardware thread 102 can send an idle indication to the scheduler 108, which can update a corresponding bit in the respective thread domain bitmap 116 (or other data structure). When a hardware thread 102 transitions from being idle to busy, the hardware thread 102 can send a busy indication to the scheduler 108, which can update a corresponding bit in the respective thread domain bitmap 116 (or other data structure).

Although FIG. 2 shows examples with thread domains 114, in other examples, thread domains 114 are not used.

Figure 3:
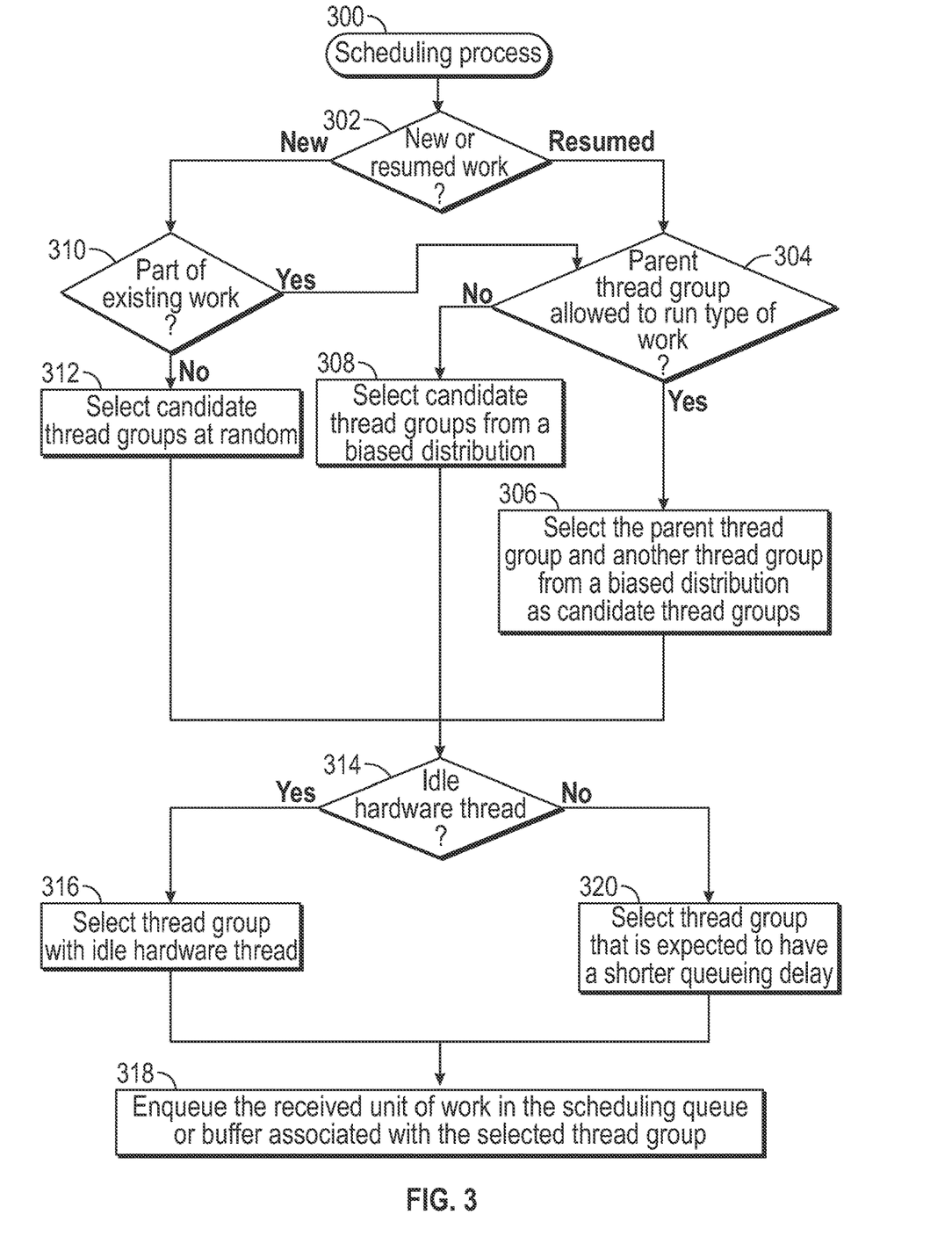
FIG. 3 is a flow diagram of a scheduling process according to some examples.

FIG. 3 is a flow diagram of a scheduling process 300 that can be performed by the scheduler 108 according to some examples, in response to receiving a unit of work (e.g., 110 in FIG. 1) that is to be scheduled for execution.

The scheduler 108 determines (at 302) whether the received unit of work is new work or resumed work. A resumed unit of work refers to existing work that was previously executing but was paused for some reason, and a request has been received to resume the paused existing work. A new unit of work can refer to work that was not previously executed. Note that a new unit of work can either be part of existing work or can be work that is not part of existing work.

"Existing work" refers to work that was previously executed by a hardware thread 102 in a given thread group 104. The given thread group 104 that executed the existing work can be referred to as a "parent" thread group.

If the received unit of work is resumed work, the scheduler 108 determines (at 304) if the parent thread group is allowed to run the type of the received unit of work. Metadata can be associated with the received unit of work, and the metadata can indicate the type of work of the received unit of work (e.g., any of the types of work noted further above). In some examples, a subset of the thread groups 104 may be reserved to execute higher priority work, such that lower priority work cannot be executed by this subset of thread groups. For example, as shown in FIG. 1, the scheduler 108 can maintain scheduler mask information 118 that identify which thread groups 104 can execute which types of work. For example, the scheduler mask information 118 can associate identifiers of respective thread groups 104 with corresponding types of work, or with an indicator that indicates that a thread group 104 can execute any type of work. The scheduler mask information 118 may be continually updated, such that the scheduler mask information 118 can be changed over time. Thus, a thread group 104 that may be allowed to execute a particular type of work previously may no longer be allowed to execute the particular type of work if the scheduler mask information 118 is changed.

If the scheduler 108 determines (at 304) that the parent thread group is allowed to execute the type of work of the received unit of work, then the scheduler 108 selects (at 306) candidate thread groups that are candidates for executing the received unit of work. In some examples, there may be two candidate thread groups selected by the scheduler 108 for any given unit of work. In other examples, the scheduler 108 may select more than two candidate thread groups.

The reason for selecting multiple candidate thread groups that can potentially run a received unit of work is so that poor scheduling choices previously made by the scheduler 108 do not continue to be used in subsequent scheduling iterations. For example, the parent thread group may not be the optimal thread group for executing the resumed work. By selecting multiple candidate thread groups from which a choice can be made to execute the received unit of work, there is some likelihood that a more optimal thread group can be selected to execute the resumed work.

The candidate thread groups selected (at 306) include the parent thread group and a further thread group that is selected at random from a biased distribution of thread groups. The biased distribution of thread groups includes those thread groups (such as in a thread domain 114) that are in closer proximity to the parent thread group. For example, if the biased distribution of thread groups includes N (N≥2), then the N thread groups that are part of the biased distribution are the N thread groups that are in closest proximity to the parent thread group, according to a proximity criterion.

In some examples, the proximity criterion can specify proximity in terms of shared resources, such as a shared L3 cache memory, a shared socket, or a shared computing node, in descending order of these shared resources. For example, thread groups including hardware threads that share an L3 cache memory are considered to be in closer proximity to one another than thread groups that do not share an L3 cache memory. Thread groups that include hardware threads in the same socket are considered to be in closer proximity to one another than thread groups with hardware threads in different sockets. Thread groups that include hardware threads in the same computing node are considered to be in closer proximity to one another than thread groups with hardware threads in different computing nodes.

In more specific examples, the biased distribution of thread groups can include N thread groups where each thread group chosen to be in the biased distribution has a 50% chance of sharing the same L3 cache memory as the parent thread group, a 25% chance of being in the same socket but not sharing the same L3 cache memory as the parent thread group, a 15% chance of being in the same computing node but not sharing the same socket, and so forth.

If the scheduler 108 determines (at 304) that the parent thread group is not allowed to run the type of the received unit of work, then the scheduler 108 selects (at 308) two candidates thread groups at random from the biased distribution of thread groups. In other words, the candidate thread groups selected (at 308) do not include the parent thread group.

If the scheduler 108 determines (at 302) that the received unit of work is new work, the scheduler 108 determines (at 310) if the received unit of work is part of existing work or is not part of existing work.

If the scheduler 108 determines (at 310) that the received unit of work is part of existing work, then that the scheduler determines (at 304) whether the parent thread group is allowed to run the type of the received unit of work, and selectively performs the selection tasks 306 and 308 as discussed above.

If the received unit of work is not part of any existing work, the scheduler 108 selects (at 312) candidate thread groups at random, such as thread groups from the same thread domain 114.

From any of tasks 306, 308, and 312, the scheduler 108 uses a selection criterion to select (at 314) from the candidate thread groups. The selection criterion can be based on a criterion that seeks to reduce the amount of delay associated with executing the received unit of work. For example, the scheduler 108 can determine whether any of the candidate thread groups has an idle hardware thread. If so, the scheduler 108 selects (at 316) the thread group from the candidate thread groups that has the idle hardware thread. The scheduler 108 then enqueues (at 318) the received unit of work into the scheduling queue 106 (or the buffer 112) associated with the selected thread group.

If none of the candidate thread groups has an idle hardware thread, then the scheduler 108 selects (at 320) the thread group from the candidate thread groups that is expected to have a shorter queuing delay. The determination of which thread group is likely to be associated with a shorter queuing delay for the received unit of work can be based on information maintained by the scheduler 108 regarding the types of work that are currently scheduled to run in each of the candidate thread groups, including the priority of the units of work, the expected length of time for execution, and so forth.

In some cases, the scheduler 108 may not have sufficient information to make the best decision regarding where to place a received unit of work at enqueue time (at the time when a thread group is selected and the received unit of work is inserted into the respective scheduling queue 106 or buffer 112). For example, a currently running unit of work may take a much longer period of time to execute than expected based on historical information of other units of work.

In response to triggers, idle hardware threads 102 of the thread groups 104 are able to steal units of work from other thread groups 104 in the same thread domain 114. For example, an idle hardware thread in a first thread group can steal a unit of work from the buffer 112 of a second thread group 104. Stealing a unit of work can refer to retrieving, by the idle hardware thread in the first thread group, information of the unit of work from the buffer 112 of the second thread group and executing the unit of work in the second thread group.

Although reference is made to stealing units of work from buffers 112, in other examples, units of work can be stolen from scheduling queues 106.

The trigger to cause a hardware thread to attempt to steal a unit of work from another thread group can include a time-based trigger that is based on a timer. Each time the timer expires, idle hardware threads in various thread groups 104 may attempt to steal work from other thread groups. Stealing attempts can be made in an order based on architectural topology, including L3 cache memories, sockets, and computing nodes. For example, an idle hardware thread may attempt to steal a unit of work first from another thread group 104 that shares the same L3 cache memory, and if not possible, steal a unit of work from another thread group 104 that shares the same socket, and if not possible, steal a unit of work from another thread group 104 that shares the same computing node.

Figure 4:
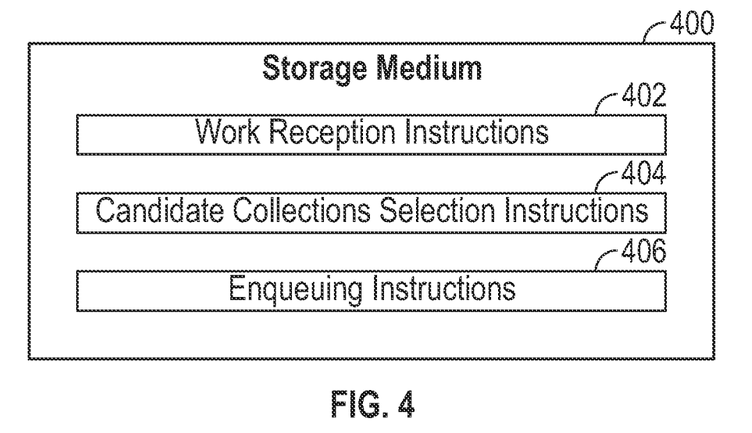
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a system to perform various tasks. The machine-readable instructions include work reception instructions 402 to receive a first unit of work to be scheduled in the system that includes a plurality of collections of processing units (e.g., a plurality of thread groups 104 as shown in FIG. 1) to execute units of work. Each collection of processing units can include one processing unit or multiple processing units. Each respective collection of processing units is associated with a corresponding scheduling queue (e.g., 106 in FIG. 1).

The machine-readable instructions include candidate collections selection instructions 404 to select, for the first unit of work according to a first criterion, candidate collections from among the plurality of collections of processing units (e.g., such as the selection of candidate thread groups in tasks 306, 308, and 312 in FIG. 3). The first criterion to select the candidate collections can include a random criterion (e.g., random selection in task 312 in FIG. 3), or a criterion relating to a selection from a biased distribution (e.g., the selection in task 308), or a criterion relating to selecting a parent thread group and a thread group from a biased distribution (e.g., the selection in task 306).

The biased distribution contains collections of processing units that have a proximity to a given collection of processing units based on a proximity criterion, where the proximity criterion specifies that a first collection of processing units is closer to the given collection of processing units than a second collection of processing units if the first collection of processing units shares a specified resource (e.g., a cache memory, a socket, or a computing node) with the given collection of processing units not shared by the second collection of processing units.

The machine-readable instructions include work enqueuing instructions 406 to enqueue the first unit of work in a schedule queue associated with a selected collection of processing units that is selected, according to a selection criterion (e.g., the selection criterion in task 314 in FIG. 3), from among the candidate collections.

Figure 5:
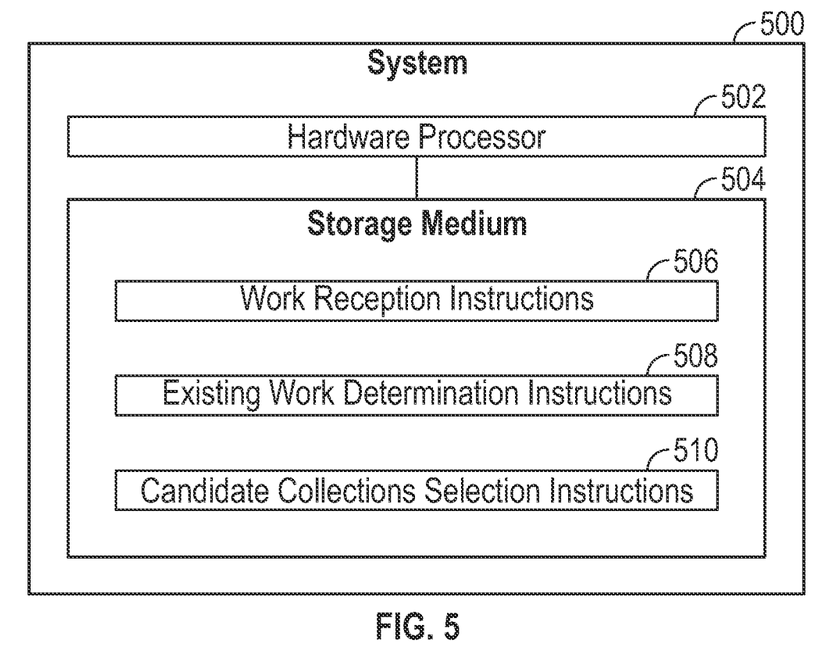
FIG. 5 is a block diagram of a computing system according to some examples.

FIG. 5 is a block diagram of a system 500 according to some examples. The system 500 includes a hardware processor 502 (or multiple hardware processors). A hardware processor can include a microprocessor, a core of a multi-core microprocessor, a microcontroller, a programmable integrated circuit, a programmable gate array, or another hardware processing circuit.

The system 500 includes a storage medium 504 storing scheduling instructions executable on the hardware processor 502 to perform various tasks. The scheduling instructions executable on a hardware processor can refer to the instructions executable on a single hardware processor or the instructions executable on multiple hardware processors.

The scheduling instructions include work reception instructions 506 to receive a first unit of work to be scheduled in a computing environment that includes a plurality of collections of processing units to execute units of work. Each respective collection of processing units is associated with a corresponding scheduling queue.

The scheduling instructions include existing work determination instructions 508 to determine whether the first unit of work includes a task of existing work previously scheduled to execute in a first collection of processing units in the computing environment. The task of existing work can include a new unit of work that is a sub-task of the existing work, or a unit of work that is resumed from the existing work that was paused.

The scheduling instructions include candidate collections selection instructions 510 to, in response to determining that the first unit of work includes the task of the existing work, select candidate collections from among the plurality of collections of processing units, where the candidate collections include the first collection of processing units if the first collection of processing units is allowed to execute a type of work of the first unit of work, and a second collection of processing units that is part of a distribution of collections of processing units that are in closer proximity to the first collection of processing units.

In some examples, the distribution of collections of processing units is based on identifying a subset of the plurality of collections of processing units that are in closer proximity to the first collection of processing units based on a proximity criterion.

The scheduling instructions select, as the candidate collections, the second collection of processing units and a third collection of processing units if the first collection of processing units is not allowed to execute the type of work of the first unit of work.

Figure 6:
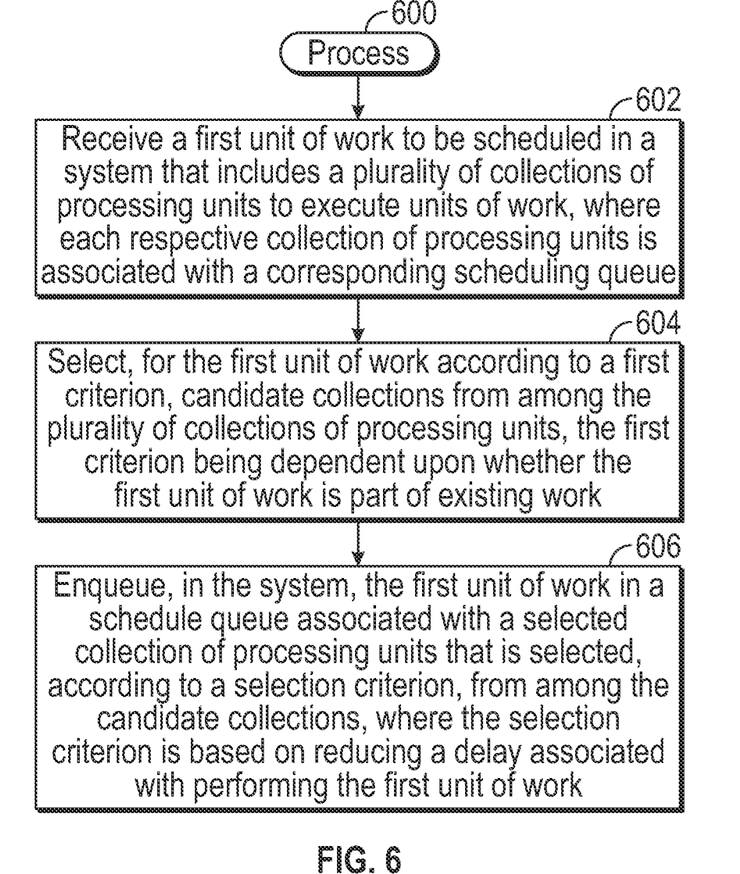
FIG. 6 is a flow diagram of a process according to some examples.

FIG. 6 is a flow diagram of a process 600 according to some examples. The process 600 can be performed by the scheduler 108 of FIG. 1, for example.

The process 600 includes receiving (at 602) a first unit of work to be scheduled in a system that includes a plurality of collections of processing units to execute units of work. Each respective collection of processing units is associated with a corresponding scheduling queue.

The process 600 includes selecting (at 604), for the first unit of work according to a first criterion, candidate collections from among the plurality of collections of processing units, the first criterion being dependent upon whether the first unit of work is part of existing work.

In some examples, the selecting of the candidate collections according to the first criterion includes, in response to determining that the first unit of work is not a task of existing work, selecting the candidate collections at random from among the plurality of collections of processing units.

In some examples, the selecting of the candidate collections according to the first criterion includes, in response to determining that the first unit of work is part of existing work performed by a given collection of processing units, selecting the candidate collections using a distribution containing collections of processing units that have a proximity to the given collection of processing units based on a proximity criterion.

The process 600 includes enqueuing (at 606), in the system, the first unit of work in a schedule queue associated with a selected collection of processing units that is selected, according to a selection criterion, from among the candidate collections. The selection criterion based on reducing a delay associated with performing the first unit of work.

A storage medium (e.g., 400 in FIG. 4 or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM), and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   receive a first unit of work to be scheduled in the system that comprises a plurality of collections of processing units to execute units of work, wherein each respective collection of processing units of the plurality of collections of processing units is associated with a corresponding scheduling queue;
   determine, based on metadata associated with the first unit of work, a type of work of the first unit of work;
   access scheduler mask information comprising information identifying different types of work that different collections of processing units of the plurality of collections of processing units are able execute;
   select, for the first unit of work according to a first criterion and the scheduler mask information, candidate collections from among the plurality of collections of processing units for the type of work of the first unit of work determined based on the metadata; and enqueue the first unit of work in a schedule queue associated with a selected collection of processing units that is selected, according to a selection criterion, from among the candidate collections.

2. The non-transitory machine-readable storage medium of claim 1, wherein each collection of processing units of the plurality of collections of processing units comprises a collection of hardware threads.

3. The non-transitory machine-readable storage medium of claim 1, wherein the selecting of the candidate collections according to the first criterion comprises:

in response to determining that the first unit of work is not a task of existing work, selecting the candidate collections at random from among the plurality of collections of processing units.

4. The non-transitory machine-readable storage medium of claim 1, wherein the selecting of the candidate collections according to the first criterion comprises:

in response to determining that the first unit of work is part of existing work previously executed at a given collection of processing units:

determining a biased distribution containing collections of processing units that are in a proximity to the given collection of processing units according to a proximity criterion, and selecting the candidate collections from among the collections of processing units in the biased distribution.

5. The non-transitory machine-readable storage medium of claim 4, wherein the selecting of the candidate collections according to the first criterion comprises:

in response to determining that the given collection of processing units is available to execute the first unit of work, selecting the given collection of processing units as one of the candidate collections.

6. The non-transitory machine-readable storage medium of claim 5, wherein the selecting of the candidate collections according to the first criterion comprises:

in response to determining that the given collection of processing units is not available to execute the first unit of work, selecting each of the candidate collections from the biased distribution.

7. The non-transitory machine-readable storage medium of claim 4, wherein the proximity criterion specifies that a first collection of processing units is closer to the given collection of processing units than a second collection of processing units if the first collection of processing units shares a specified resource with the given collection of processing units not shared by the second collection of processing units.

8. The non-transitory machine-readable storage medium of claim 7, wherein the specified resource comprises a cache memory, a socket, or a computing node.

9. The non-transitory machine-readable storage medium of claim 4, wherein the determining that the first unit of work is part of the existing work comprises determining that the first unit of work is a new task of the existing work.

10. The non-transitory machine-readable storage medium of claim 4, wherein the determining that the first unit of work is part of the existing work comprises determining that the first unit of work is resumed from the existing work.

11. The non-transitory machine-readable storage medium of claim 1, wherein the selection criterion specifies a selection of the selected collection of processing units from among the candidate collections based on which of the candidate collections is idle or based on expected queuing delays of the candidate collections.

12. The non-transitory machine-readable storage medium of claim 11, wherein the candidate collections are part of a thread domain including collections of processing units that share a resource, wherein the thread domain is part of a plurality of thread domains.

13. The non-transitory machine-readable storage medium of claim 11, wherein a processing unit of each of the plurality of collections of processing units is to provide an indicator of whether the processing unit is idle.

14. A system comprising:
a processor; and
a non-transitory machine-readable storage medium storing scheduling instructions executable on the processor to:

receive a first unit of work to be scheduled in a computing environment that comprises a plurality of collections of processing units to execute units of work, wherein each respective collection of processing units of the plurality of collections of processing units is associated with a corresponding scheduling queue;

determine whether the first unit of work includes a task of existing work previously scheduled to execute in a first collection of processing units in the computing environment; and in response to determining that the first unit of work includes the task of the existing work:

select candidate collections from among the plurality of collections of processing units, the candidate collections comprising the first collection of processing units if the first collection of processing units is allowed to execute a type of work of the first unit of work, and a second collection of processing units that is part of a distribution of collections of processing units that are in closer proximity to the first collection of processing units.

15. The system of claim 14, wherein the selecting of the candidate collections comprises selecting the second collection of processing units and a third collection of processing units if the first collection of processing units is not allowed to execute the type of work of the first unit of work.

16. The system of claim 14, wherein the scheduling instructions are executable on the processor to:

determine the distribution of collections of processing units based on identifying a subset of the plurality of collections of processing units that are in closer proximity to the first collection of processing units based on a proximity criterion.

17. The system of claim 16, wherein the proximity criterion comprises a criterion relating to physical resources associated with the plurality of collections of processing units.

18. The system of claim 14, wherein an idle processing unit of a given collection of processing units is to retrieve and execute a unit of work from a scheduling queue of another collection of processing units.

19. A method comprising:
receiving, in a system comprising a hardware processor, a first unit of work to be scheduled in the system that comprises a plurality of collections of processing units to execute units of work, wherein each respective collection of processing units of the plurality of collections of processing units is associated with a corresponding scheduling queue;

determining, by the system, whether the first unit of work includes a task of existing work previously scheduled to execute in a first collection of processing units in the system;

in response to determining that the first unit of work includes the task of the existing work, selecting, by the system for the first unit of work, candidate collections from among the plurality of collections of processing units, the candidate collections comprising the first collection of processing units if the first collection of processing units is allowed to execute a type of work of the first unit of work, and a second collection of processing units that is part of a distribution of collections of processing units that are in closer proximity to the first collection of processing units; and enqueuing, in the system, the first unit of work in a schedule queue associated with a selected collection of processing units that is selected, according to a selection criterion, from among the candidate collections, the selection criterion based on reducing a delay associated with performing the first unit of work.

20. The method of claim 19, comprising:

determining, by the system, the distribution of collections of processing units based on identifying a subset of the plurality of collections of processing units that are in closer proximity to the first collection of processing units based on a proximity criterion.

\* \* \* \* \*